US006826576B2

(12) United States Patent
Lulich et al.

(10) Patent No.: US 6,826,576 B2
(45) Date of Patent: Nov. 30, 2004

(54) VERY-LARGE-SCALE AUTOMATIC CATEGORIZER FOR WEB CONTENT

(75) Inventors: Daniel P. Lulich, Portland, OR (US); Farzin G. Guilak, Beaverton, OR (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 09/963,178

(22) Filed: Sep. 25, 2001

(65) Prior Publication Data

US 2002/0174095 A1 Nov. 21, 2002

Related U.S. Application Data

(60) Provisional application No. 60/289,418, filed on May 7, 2001.

(51) Int. Cl.[7] .............................................. G06F 17/30
(52) U.S. Cl. .......................................... 707/102; 707/7
(58) Field of Search ............................... 707/102, 7, 6; 706/14

(56) References Cited

U.S. PATENT DOCUMENTS

| | | | |
|---|---|---|---|
| 5,418,951 A | | 5/1995 | Damashek |
| 5,428,778 A | | 6/1995 | Brookes |
| 5,461,698 A | * | 10/1995 | Schwanke et al. ............ 706/20 |
| 5,537,586 A | | 7/1996 | Amram et al. |
| 5,576,954 A | | 11/1996 | Driscoll |
| 5,640,468 A | | 6/1997 | Hsu |
| 5,652,829 A | * | 7/1997 | Hong ........................... 706/59 |
| 5,657,424 A | * | 8/1997 | Farrell et al. ................ 704/255 |
| 5,706,507 A | | 1/1998 | Schloss |
| 5,752,051 A | | 5/1998 | Cohen |
| 5,787,420 A | | 7/1998 | Tukey et al. |
| 5,794,236 A | | 8/1998 | Mehrle |
| 5,809,499 A | | 9/1998 | Wong et al. |
| 5,832,470 A | | 11/1998 | Morita et al. |
| 5,835,905 A | | 11/1998 | Pirolli et al. |
| 5,867,799 A | | 2/1999 | Lang et al. |
| 5,870,744 A | | 2/1999 | Sprague |
| 5,909,680 A | | 6/1999 | Hull |
| 5,911,043 A | | 6/1999 | Duffy et al. |
| 5,943,670 A | | 8/1999 | Prager |
| 6,003,029 A | | 12/1999 | Agrawal et al. |
| 6,058,205 A | * | 5/2000 | Bahl et al. ................... 382/159 |
| 6,128,613 A | * | 10/2000 | Wong et al. .................... 707/7 |
| 6,161,130 A | * | 12/2000 | Horvitz et al. .............. 709/206 |
| 6,163,778 A | | 12/2000 | Fogg et al. |
| 6,233,575 B1 | * | 5/2001 | Agrawal et al. ............... 707/6 |
| 6,249,785 B1 | | 6/2001 | Paepke |
| 6,252,988 B1 | * | 6/2001 | Ho .............................. 382/229 |
| 6,285,999 B1 | | 9/2001 | Page |
| 6,430,558 B1 | | 8/2002 | Delano |
| 6,473,753 B1 | | 10/2002 | Katariya et al. |
| 6,507,843 B1 | * | 1/2003 | Dong et al. .................... 707/6 |
| 6,519,580 B1 | * | 2/2003 | Johnson et al. .............. 706/47 |
| 6,604,114 B1 | * | 8/2003 | Toong et al. ............ 707/104.1 |
| 2001/0032029 A1 | * | 10/2001 | Kauffman ..................... 700/99 |
| 2001/0042085 A1 | * | 11/2001 | Peairs et al. ................. 707/526 |
| 2002/0099730 A1 | * | 7/2002 | Brown et al. ............... 707/500 |
| 2002/0152222 A1 | * | 10/2002 | Holbrook ................. 707/104.1 |

* cited by examiner

*Primary Examiner*—Wayne Amsbury
(74) *Attorney, Agent, or Firm*—Senniger Powers

(57) ABSTRACT

A method and apparatus for efficiently classifying and categorizing data objects such as electronic text, graphics, and audio based documents within very-large-scale hierarchical classification trees is provided. In accordance with one embodiment of the invention, a first node of a plurality of nodes of a subject hierarchy is selected. Previously classified data objects corresponding to a selected first node of a subject hierarchy as well as any associated sub-nodes of the selected node are aggregated to form a content class of data objects. Similarly, data objects corresponding to sibling nodes of the selected node and any associated sub-nodes of the sibling nodes are then aggregated to form an anti-content class of data objects. Features are then extracted from each of the content class of data objects and the anti-content class of data objects to facilitate characterization of said previously classified data objects.

22 Claims, 11 Drawing Sheets

510 → Submarine magazine "marches" to maritime market.
512 → submarine magazine marches to maritime market

| N-Gram (N=3) | Frequency (#occur.) | Rank |
|---|---|---|
| mar | 4 | 1 |
| e_m | 3 | 2 |
| ari | 2 | 3 |
| ine | 2 | 4 |
| ne_ | 2 | 5 |
| _ma | 2 | 6 |
| sub | 1 | 7 |
| ubm | 1 | 8 |
| bma | 1 | 9 |
| rin | 1 | 10 |
| _ma | 1 | 11 |
| mag | 1 | 12 |
| aga | 1 | 13 |
| gaz | 1 | 14 |
| azi | 1 | 15 |
| zin | 1 | 16 |
| e_m | 1 | 17 |
| arc | 1 | 18 |
| rch | 1 | 19 |
| che | 1 | 20 |
| hes | 1 | 21 |
| es_ | 1 | 22 |
| s_t | 1 | 23 |
| _to | 1 | 24 |
| to_ | 1 | 25 |
| o_m | 1 | 26 |
| rit | 1 | 27 |
| iti | 1 | 28 |
| tim | 1 | 29 |
| ime | 1 | 30 |
| me_ | 1 | 31 |
| ark | 1 | 32 |
| rke | 1 | 33 |
| ket | 1 | 34 |

VERY-LARGE-SCALE AUTOMATIC CATEGORIZER FOR WEB CONTENT

RELATED APPLICATIONS

This application is a non-provisional application of the earlier filed provisional application No. 60/289,418, filed on May 7, 2001, and claims priority to the earlier filed '418s provisional application, whose specification is hereby fully incorporated by reference.

BACKGROUND OF THE INVENTION

1. Field of the Invention

The invention relates to the field of data processing. More specifically, the invention relates to the automatic analysis of the content of electronic data objects and the categorization of the electronic data objects into one or more discrete categories.

2. Background Information

The Internet consists of billions of discrete pages, which can be accessed from any browser-equipped computer or appliance connected to the World Wide Web (hereinafter "Web"). The availability of so many pages simultaneously represents both a boon and a bane to the user. Information, opinion, and news are available about a vast array of topics, but the challenge is to find those pages of the Web which are most relevant to the particular needs or desires of the user at any given moment.

A number of search engines are available on the Web for free use. These search engines typically index some fraction of the pages available on the Web, and provide users with the ability to search for information on the Web using keywords or may not know how to correctly formulate a search query to find the most appropriate page(s).

Another method of organizing the Web is the use of categorical hierarchies. Certain companies have analyzed the contents of tens or hundreds of thousands of web pages, placing each page into one or more of the categories in their particular subject hierarchy. Users can then browse such subject hierarchies, or search through them based upon keywords. Such searches provide results annotated with the subject area of the target page, which can assist the user in determining whether the page might be relevant to the actual topic being searched.

FIG. 10 illustrates an exemplary prior art subject hierarchy 1002 in which multiple decision nodes (hereinafter "nodes") 1030–1036 are hierarchically arranged into multiple parent and/or child nodes, each of which are associated with a unique subject category. For example, node 1030 is a parent node to nodes 1031 and 1032, while nodes 1031 and 1032 are child nodes to node 1030. Because nodes 1031 and 1032 are both child nodes of the same node (e.g. node 1030), nodes 1031 and 1032 are said to be siblings of one another. Additional sibling pairs in subject hierarchy 1002 include nodes 1033 and 1034, as well as nodes 1035 and 1036. It can be seen from FIG. 10 that node 1030 forms a first level 1037 of subject hierarchy 1002, while nodes 1031–1032 form a second level 1038 of subject hierarchy 1002, and nodes 1033–1036 form a third level 1039 of subject hierarchy 1002. Additionally, node 1030 is referred to as a root node of subject hierarchy 1002 in that it is not a child of any other node.

In general, search hierarchies are filled with pages by manual classification of individual web pages using the talents of experts in particular subject fields. This method has several problems, including the cost of finding experts to perform the classification, and the necessary backlog between the time a site is placed on the Web and the time (if ever) it enters the classification hierarchy, moreover a grader expert in one subject area may misclassify a page of another subject, which can make the page more difficult to find for the casual browser.

Although this is an active area of research, existing systems typically work with only a limited number of subject fields and often display poor performance. Therefore, what is desired is an automatic system for classifying a large number of documents quickly and effectively into a large subject hierarchy.

BRIEF DESCRIPTION OF DRAWINGS

The present invention will be described by way of exemplary embodiments, but not limitations, illustrated in the accompanying drawings in which like references denote similar elements, and in which:

FIG. 5 illustrates an exemplary N-gram feature extraction list obtained in accordance with one embodiment of the invention;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, storing, selecting, determining, calculating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor includes microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
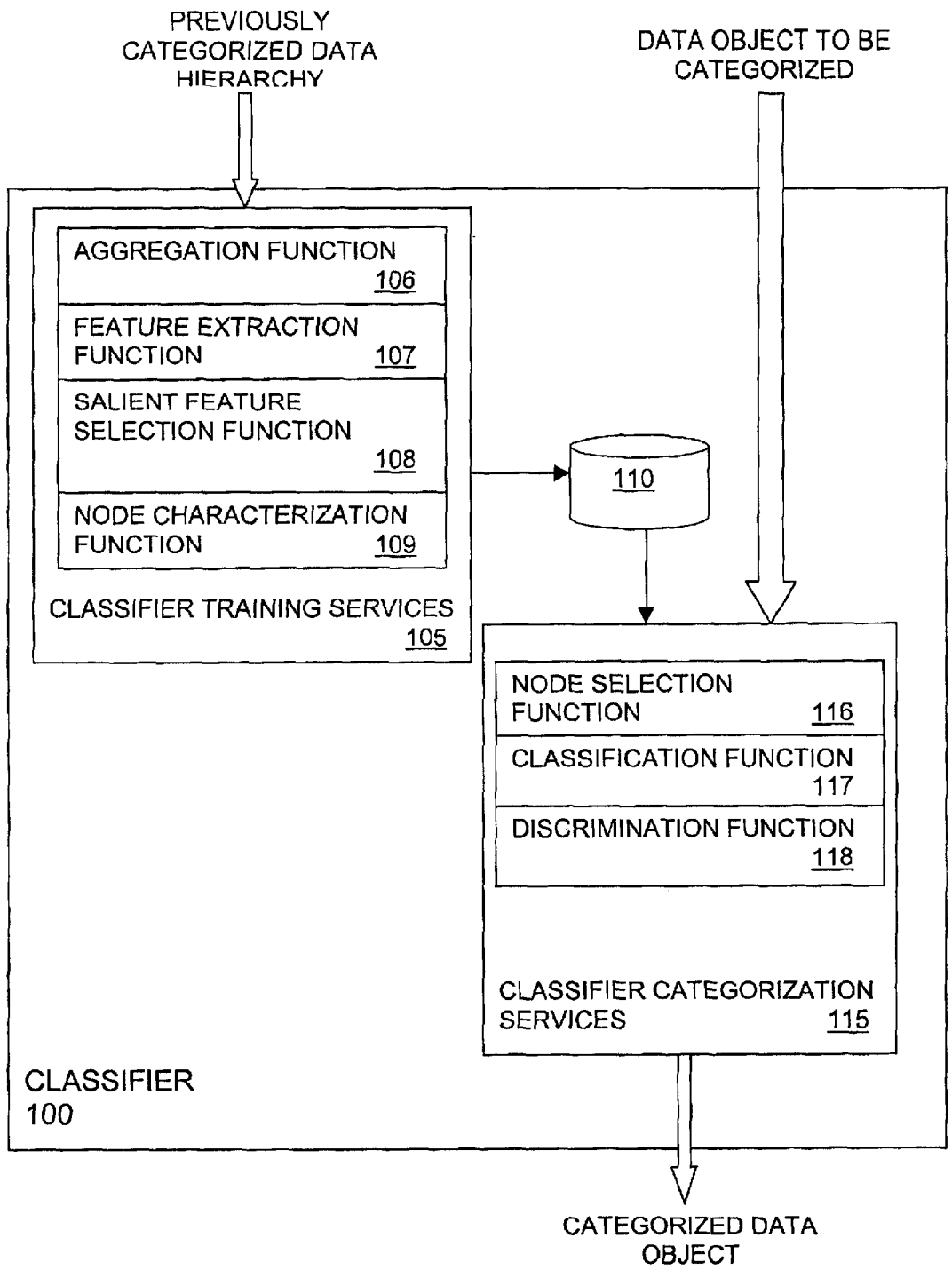
FIG. 1 illustrates an overview of the present invention, in accordance with one embodiment.

Referring first to FIG. 1, wherein a diagram illustrating an overview of the present invention, in accordance with one embodiment, is shown. As illustrated, classifier 100 is provided to efficiently classify and categorize data objects such as electronic documents including but not limited to text files, image files, audio sequences and video sequences comprising both proprietary and non-proprietary formats, within very-large-scale hierarchical classification trees.

Classifier 100 includes classifier training services 105 for extracting classification rules from a previously categorized data hierarchy and for training classifier 100 to categorize new data objects based upon those rules. Classifier training services 105 includes aggregation function 106, feature extraction function 107, salient feature selection function 108, and node characterization function 109. In accordance with the illustrated embodiment, content from the previously categorized data hierarchy is aggregated at each node in the hierarchy, through aggregation function 106 for example, to form both content and anti-content groups of data. Features from each of these groups of data are extracted by feature extraction function 107 for example, and a subset of those features are determined to be salient and are selected by way of salient feature selection function 108 for example. Node characterization function 109 is utilized to characterize each node of the previously categorized data hierarchy based upon the selected salient features, and to store such hierarchical characterizations in data store 110 for example, for further use by classifier categorization services 115.

Once classifier 100 is trained, classifier categorization services 115 facilitate categorization of new data objects input into classifier 100. Classifier categorization services 115 include node selection function 116 for successively selecting the hierarchical characterizations stored e.g. in data store 110, for comparison against new data objects; classification function 117 for comparing new data objects input into classifier 100 against one or more of the selected node characterizations, and for generating a confidence rating (i.e. score) based upon each comparison; and discrimination function 118 for categorizing the new data objects based upon the determined confidence ratings.

Although classifier training services 105 including aggregation function 106, feature extraction function 107, salient feature selection function 108, node characterization function 109, as well as classifier categorization services 115 including node selection function 116, classification function 117, and discrimination function 118 are each illustrated as separate elements, it will be readily apparent from the description to follow, that the present invention may be practiced with some or all of these elements combined or further subdivided.

Classifier Training

Figure 2:
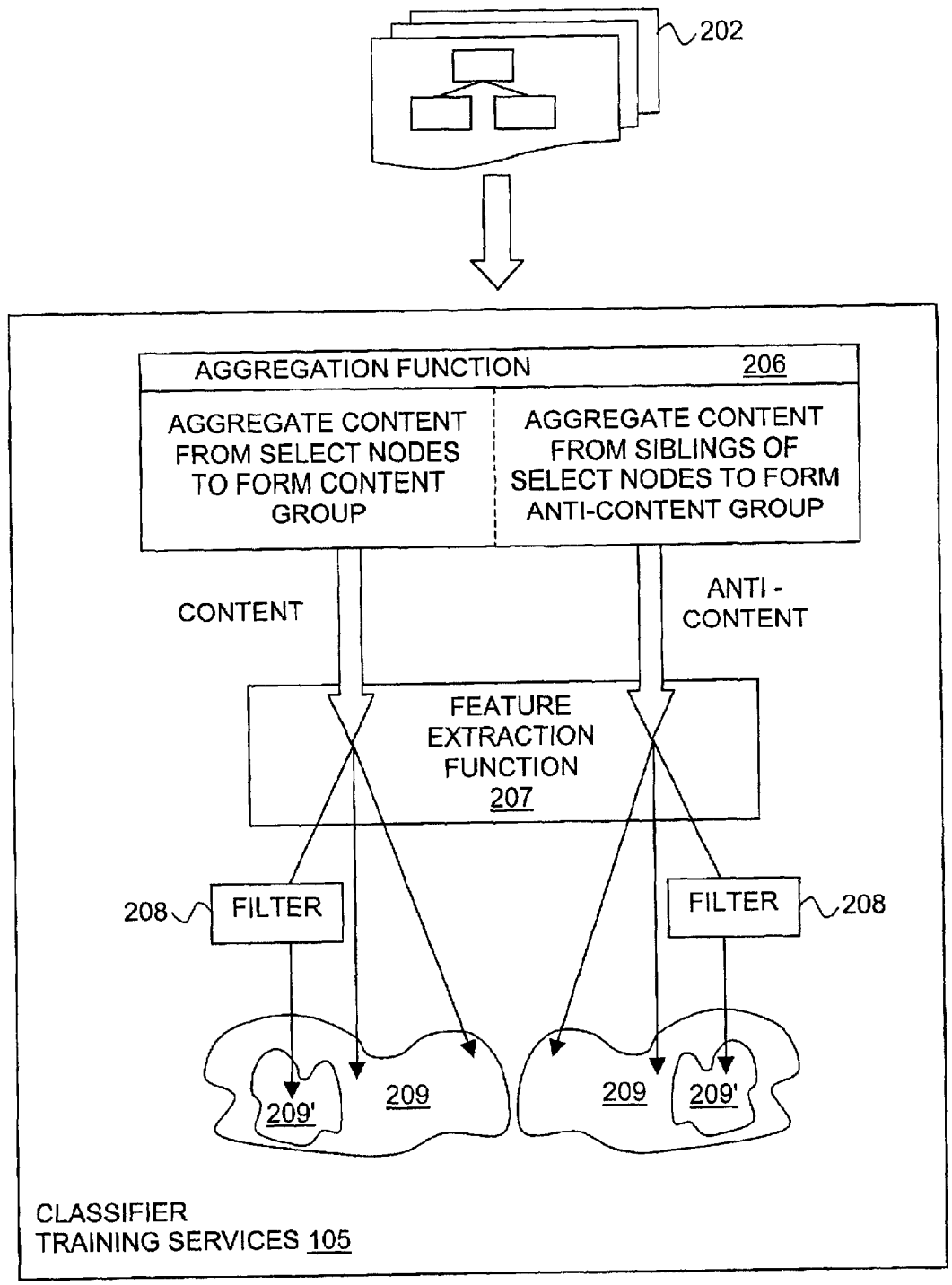
FIG. 2 illustrates a functional block diagram of the classifier training services of FIG. 1, in accordance with one embodiment of the invention.

FIG. 2 illustrates a functional block diagram of classifier training services 105 of FIG. 1, in accordance with one embodiment of the invention. As illustrated in FIG. 2, previously categorized data hierarchy 202 is provided for input into classifier training services 105 of classifier 100. Previously categorized data hierarchy 202 represents a set of electronic documents which have been previously classified and categorized into a subject hierarchy (typically through manual entry by individuals). For example, previously categorized data hierarchy 202 may represent one or more sets of electronic documents previously categorized by a Web portal or search engine.

Aggregation function 206 aggregates content so as to increase differentiation between sibling nodes at each level of the hierarchy. In one embodiment, aggregation function 206 aggregates content from previously categorized data hierarchy 202 into content and anti-content data groups. In one embodiment, content aggregated from a selected node and all sub-nodes of the selected node is used to form the content data group, whereas content aggregated from the siblings of the selected node and all sub-nodes of such sibling nodes is used to form the anti-content data group. In other embodiments, content and anti-content data groups may each be based upon any combination of nodes within the hierarchy.

Feature extraction function 207 operates to extract features from the content and anti-content groups of data, while salient feature selection function 208 operates in the form of a filter to determine which of the extracted features is to be considered salient and to distinguish such salient features (209') from the larger group of extracted features (209).

Additionally, node characterization function 109 of FIG. 1 operates to characterize the content and anti-content groups of data. In one embodiment, the content and anti-content groups of data are characterized based upon the determined salient features. In one embodiment, the characterizations are stored in data store 110, which can be implemented in the form of any number of data structures such as a database, a directory structure, or a simple lookup table. In one embodiment of the invention, the parameters for the classifiers for each node are stored in a hierarchical categorization tree having a file structure that mimics the previously categorized data hierarchy. However, the parameters for the classifiers need not be stored in a hierarchical structure.

Classifier Training Method

In accordance with one embodiment of the present invention, the construction of a hierarchical categorization tree, through the training of classifier 100 for example, is accomplished by making decisions at each node of the data hierarchy on a one-to-one basis. In another embodiment, decisions at each node of the data hierarchy are made in a one-to-many basis. That is, at each node of the hierarchy, the content of one or more documents corresponding to one sub node is compared to document content corresponding to all the other sub nodes of that node, rather than comparing document content of one sub node to document content of a single other sub node, or comparing document content of one sub node to all the documents in the entire tree. Accordingly, this method advantageously avoids adding undesirable "noise" to the decision process.

Figure 3:
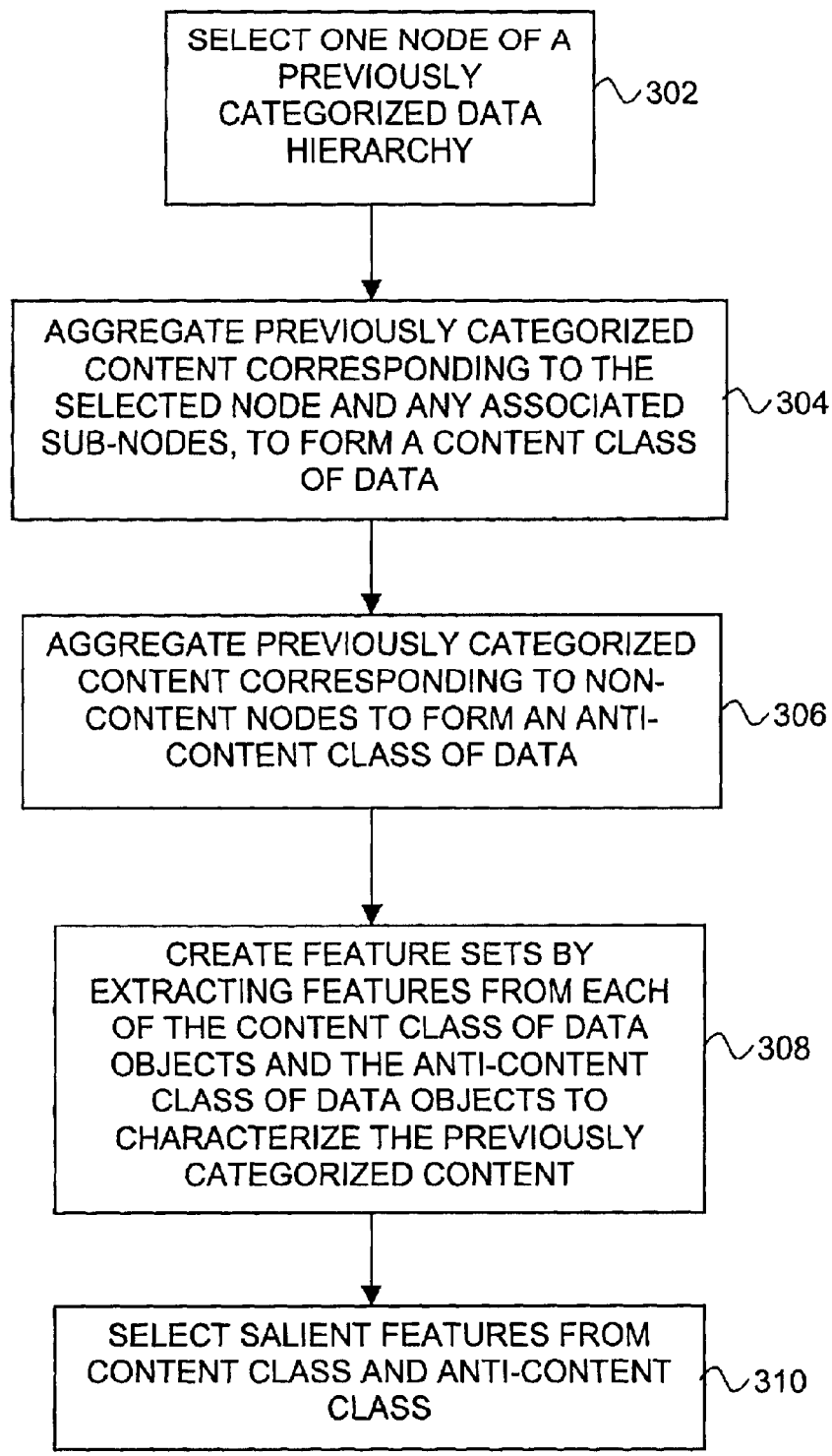
FIG. 3 illustrates the operational flow of relevant aspects of the classifier training services of FIG. 1, in accordance with one embodiment of the invention.

FIG. 3 illustrates the operational flow of certain aspects of classifier training services 105 of FIG. 1, in accordance with one embodiment of the invention. Beginning at block 302, a first node of a previously categorized data hierarchy is selected. In one embodiment, the selected node is a root node, whereas in other embodiments, the selected node may be a child node. Once a node is selected, previously categorized content corresponding to the selected node and any sub-nodes (i.e. child nodes) is aggregated to form what is referred to as a content class of data, block 304. Similarly, previously categorized content corresponding to non-content nodes are aggregated to form an anti-content class of data, block 306. In one embodiment, the sibling nodes of the selected node (i.e., all other child nodes of the selected node's parent), as well as any sub-nodes of these sibling nodes are aggregated to form an anti-content class of data. Once the content and anti-content classes of data have been formed, feature sets are created from each respective class of data (e.g., content and anti-content) to facilitate characterization of the previously categorized content, block 308, and features determined to be most salient are then identified from the content and anti-content feature sets, block 310. In one embodiment, the feature sets are N-gram based feature sets.

A document typically consists of a sequence of words, where the term "word" is commonly understood to represent a group of letters within a language, having some semantic meaning. In the present invention, the term "feature" is used to describe any group of alphanumeric characters, which may or may not form a whole or part of a word. More generally, a "word" or "feature" could be an N-token gram, where a token is one atomic element of a language. This would include N-letter grams and N-word grams in English, as well as N-ideogram grams in Asian languages such as Japanese.

Figure 4:
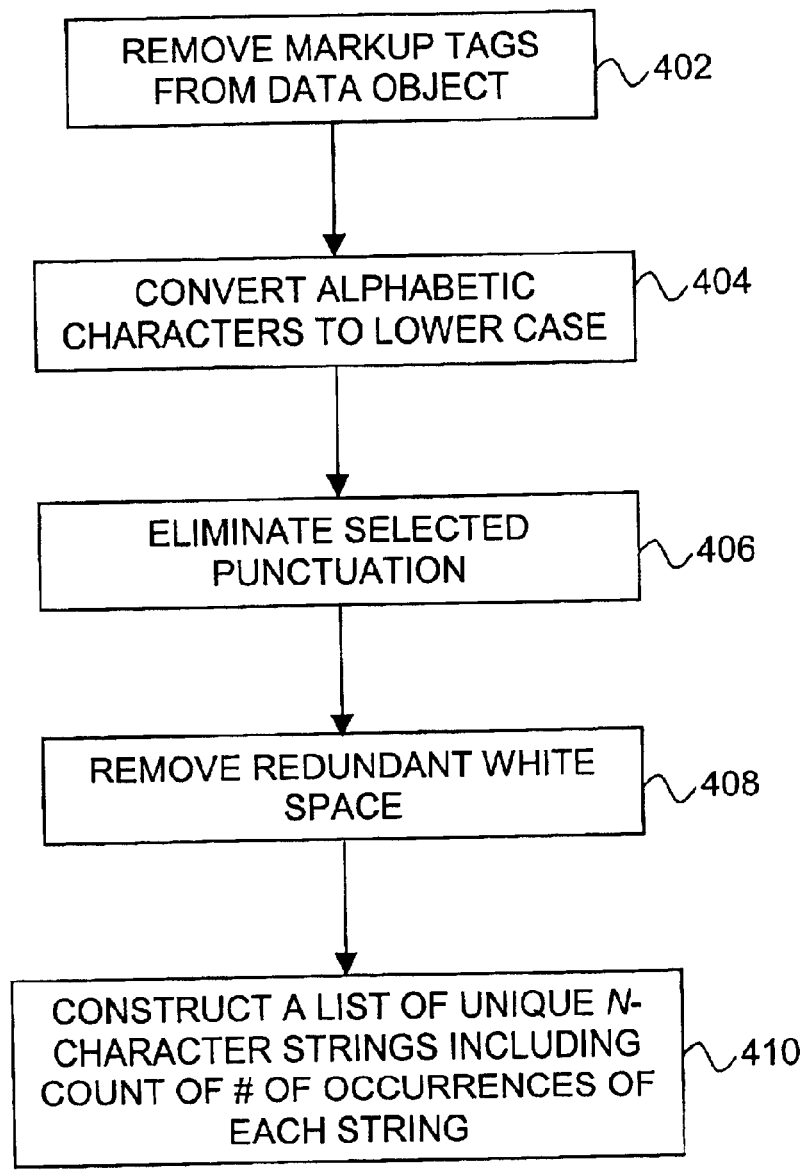
FIG. 4 illustrates the operational flow of relevant aspects of the feature extraction function of FIG. 1, in accordance with the teachings of the present invention.

In various embodiments of the invention, feature extraction includes preprocessing of the content and anti-content data classes of the data object. Such preprocessing may include removal of formatting, markup and/or punctuation characters for example. FIG. 4 illustrates one embodiment of an operational flow of the feature extraction function of FIG. 1 including preprocessing. In accordance with the illustrated embodiment, as part of the preprocessing of the data object, markup language specific tags, such as hypertext markup language (HTML) tags, standard markup language (SGML) tags, extensible markup language (XML) tags, and so forth are removed from the data object to be categorized, block 402. Additionally, uppercase alphabetic characters are converted to lower case characters, certain selected punctuation such as the dollar sign ("$") is eliminated, and redundant white space is removed from the data object, blocks 404, 406, and 408 respectively. It should be noted that variations to the above described preprocessing are entirely possible and contemplated. For example, all white spaces could be removed from the data object instead of only redundant white spaces being removed, punctuation in addition to the dollar sign may be eliminated, or no punctuation need be eliminated, and so forth.

Once the data object has been prepared through preprocessing (according to whether preprocessing has been deemed desirable), a list of unique character strings existing in the data object is constructed including a count of the number of occurrences of each data string, block 410. In one embodiment of the invention, the character strings are N-gram based, although other methods of determining character strings may be utilized. N-grams are sequences of N consecutive characters in a document, for example, that can be generated by "sliding a window" N characters wide across the document's text one character at a time. In one embodiment of the invention, a list of unique 3-character, 4-character, and 5-character N-gram based strings is constructed. The respective strings may be combined into a single list or they each may be maintained in a separate list.

FIG. 5 illustrates an exemplary N-gram feature extraction list obtained in accordance with one embodiment of the invention in which N=3. For explanatory purposes, sentence 510 (e.g., 'Submarine magazine "marches" to maritime market.') is intended to represent a character string from which a feature extraction list of N-grams is to be constructed. Before the features are extracted from sentence 510, however, the sentence is preprocessed by converting uppercase characters (502) to lowercase, and removing punctuation (504 and 508) and redundant white space (506) resulting in character string 512. From character string 512, a list of all unique 3-character strings 514 is created, along with the number of occurrences 516 (i.e., frequency) of each unique 3-character string 514, and the resulting rank 518 of each unique 3-character string 514 based upon each respective string's rank 518. Sliding a 3-character wide window one character at a time across character string 512, results in the construction of a list of thirty-four unique 3-character strings each having a frequency of occurrence ranging from one to four.

It should be noted that sentence 510 is presented for illustrative purposes only, as it constitutes only a small portion of content that a typical data object might contain. Accordingly, the number and frequency of 3-grams obtained from sentence 510 may not necessarily be typical of most data objects. More likely, the data objects will contain a far greater number of N-grams having greater frequencies than that shown. Notwithstanding this, sentence 510 is nonetheless useful in illustrating certain principles of the present invention.

Salient Feature Selection

Figure 6:
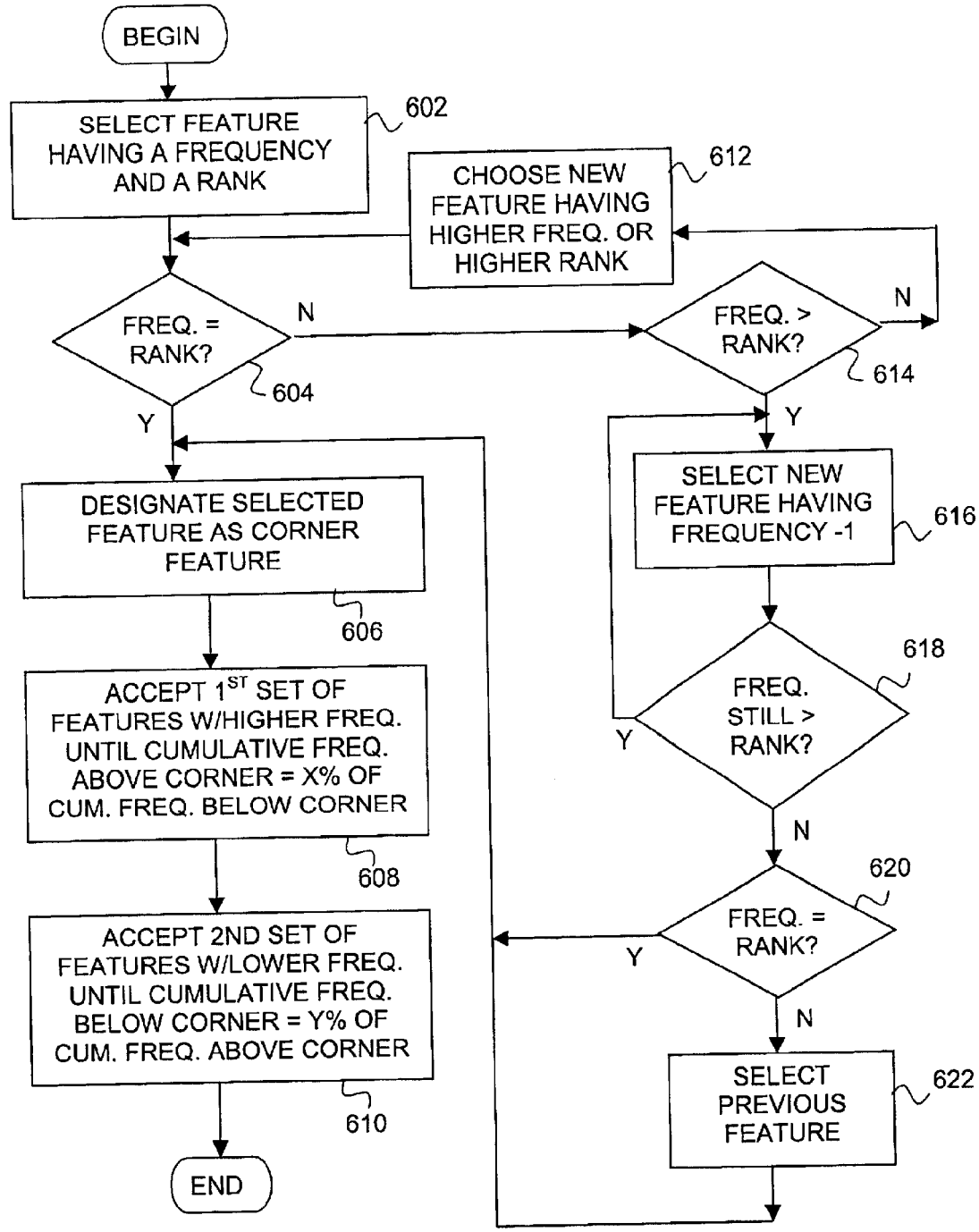
FIG. 6 illustrates an operational flow of certain aspects of salient feature selection function of FIG. 1, in accordance with one embodiment of the invention.

As mentioned above in accordance with one embodiment of the invention, salient features are determined and selected from the extracted features, which have been ranked based upon each feature's number of occurrences (i.e. frequency) in the data object. FIG. 6 illustrates an operational flow of relevant aspects of salient feature selection function 108 of FIG. 1, in accordance with one embodiment of the invention. To begin the salient feature selection process, a feature is randomly selected from the list of extracted features, block 602, and a determination is then made as to whether the frequency of the selected feature is equal to the associated rank of the selected feature, block 604. If the frequency of the selected feature is equal to the associated rank of the selected feature, the selected feature is designated as a "corner" feature, block 606. Once the corner feature is established, a first set of features having a higher frequency of occurrence than that of the corner feature are identified and a second set of features having a lower frequency of occurrence than that of the corner feature are identified. In one embodiment, features having a higher frequency than that of the corner feature are accepted into the first set of features until the cumulative frequency of the first set of features equals twenty percent of the cumulative frequency of the features having a lower frequency than that of the corner feature, block 608. Likewise, in one embodiment, features having a lower frequency than that of the corner feature are accepted into the second set of features until the cumulative frequency of the second set of features equals eighty percent of the cumulative frequency of the features having a higher frequency than that of the corner feature, block 610. In one embodiment, the features included within the first and second sets of features are determined to be salient features.

If, however at block 604, it is determined that the frequency of the selected feature is not equal to the associated rank of the selected feature, a further determination is made as to whether the frequency of the selected feature is greater than the associated rank of the selected feature, block 614. If it is determined that the frequency of the selected feature is not greater than the associated rank of the selected feature (i.e., the frequency is less than the associated rank), then a new feature is chosen having either a higher frequency or higher rank than the originally selected feature, block 612. Once a new feature is chosen, a new determination is made as to whether the frequency of the newly selected feature is equal to the associated rank of the newly selected feature, block 604.

If it is determined (i.e. at block 614) that the frequency of the selected feature is greater than the associated rank of the selected feature, then a new feature is selected from the list of features having the next lower frequency than the frequency of the previously selected feature, block 616. In many cases this new feature having the next lower frequency may be obtained by subtracting one from the previous frequency. Once a new feature having a lower frequency is obtained, a further determination is made as to whether the frequency of the new feature remains greater than the associated rank of the new feature, block 618. If the frequency of the new feature is still greater than the associated rank of the new feature, another new feature is selected having an even lower frequency, block 616. This procedure is repeated until the frequency of the feature becomes equal to or less than the associated rank of the feature. If the frequency of the feature becomes equal to the associated rank of the feature, block 622, then that feature is then designated as a corner feature, and a first and second set of features are selected as described above with respect to blocks 606, 608, and 610. If, however, the frequency of the feature becomes greater than the associated rank of the feature, the previously selected feature is once again selected, block 622. The newly selected feature is then designated as a corner feature, and a first and second set of features are selected as described above with respect to blocks 606, 608, and 610.

In one embodiment, the number of features included within the first and/or second sets of features is limited by an absolute number rather than by a percentage of total features. For example, the first set of features may be limited to include features with a cumulative frequency equaling either twenty percent of the cumulative frequency of the features having a lower frequency than that of the corner feature or up to a total of 5000 features, whichever comes first. Similarly, both first and second sets of features taken together may be limited to include a total of 5000 features for instance, regardless of the respective percentages.

Figure 7:
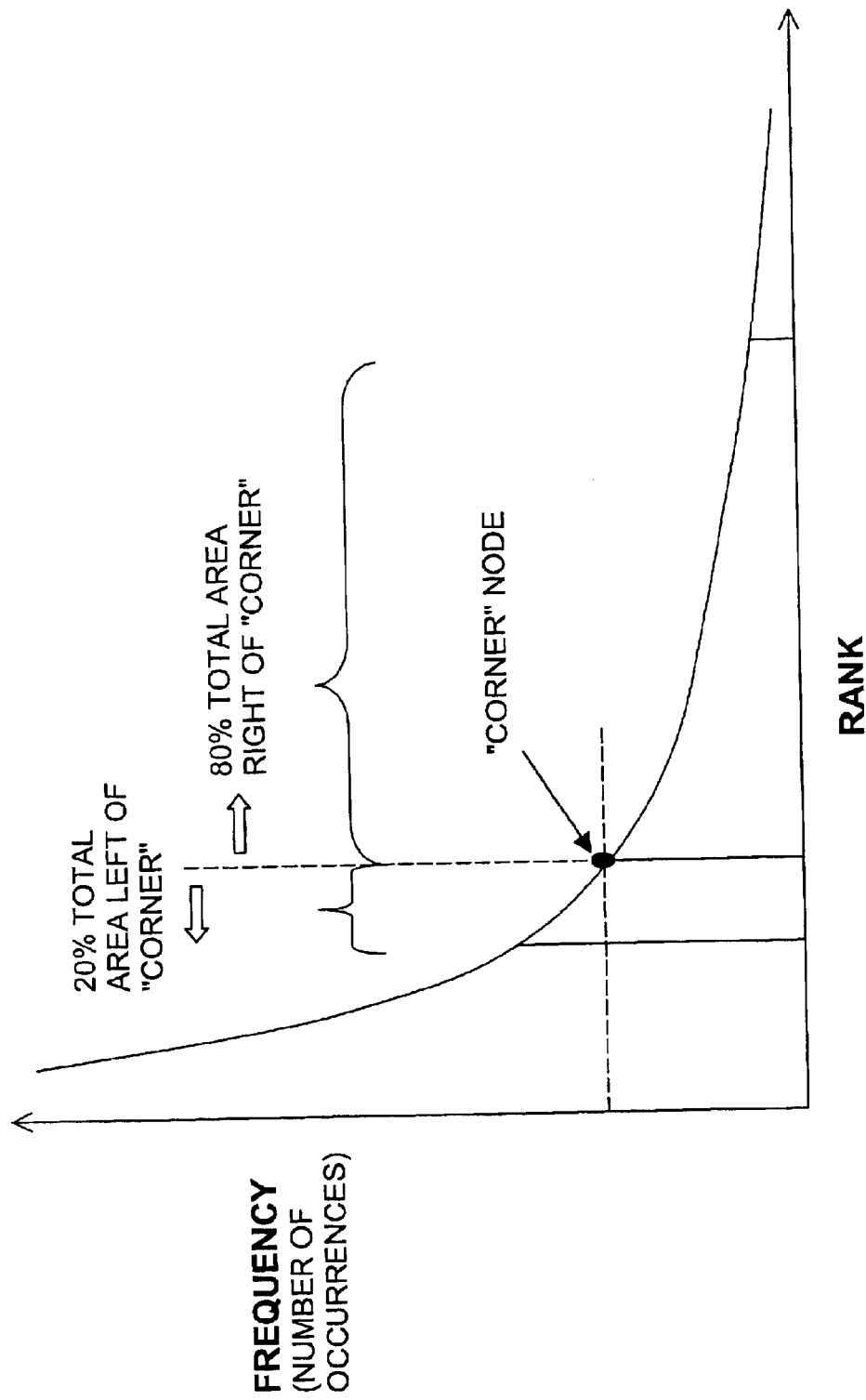
FIG. 7 illustrates a graphical representation of one embodiment of the salient feature selection function described with respect to FIG. 6.

FIG. 7 illustrates a graphical representation of one embodiment of the salient feature selection process described above with respect to FIG. 6. In FIG. 7, a plot of feature frequency values versus feature rank values is shown. In the plot, the selected "corner" node is indicated, as is the first set of features located to the left of the corner node, representing twenty percent of the cumulative frequencies to the right of the corner node, and the second set of features located to the right of the "corner" node, representing eighty percent of the cumulative frequencies to the left of the corner node as described above. This 80-20 operating rule (i.e. 80% of the cumulative frequencies above corner node and 20% of the cumulative frequencies below the corner node) is derived from the notion that features in the middle of the frequency distribution (e.g., those features corresponding to the 80-20 rule) are most representative of the content of a data object such as an electronic document. Often the features at higher frequencies are representative of the language of the document, whereas features at lower frequencies are representative of unique, rare, or misspelled words in the document.

In an alternative embodiment, salient features may also be determined and selected from the content and anti-content classes of data by eliminating a certain number of the most frequent features. In one embodiment, the number of features eliminated is dependent upon the level of the corresponding node. For example, the 400 most frequent features may be eliminated for top-level nodes in the search hierarchy, whereas 150 most frequent features may be eliminated for the second level nodes, and 10 most frequent features may be eliminated for the third and lower level nodes of the hierarchy. Such an adjustment is useful because data objects found at the top level nodes of the hierarchy are characterized by more irrelevant N-grams for example, with a broader selection of keywords and themes encountered in the agglomerated subordinate nodes, whereas the data objects at lower level nodes are more similar to one another and thus exhibit more frequent use of relevant terms. In other embodiments, salient features may be selected by way of information theoretics including mutual information.

Further methods of determining salient features are described e.g. in copending, contemporaneously filed U.S. patent application Ser. No. 09/963,170, titled "Method and Apparatus for Automatically Determining Salient Features for Object Classification", and having a common assignee as the present application.

Classification/Categorization

Once classifier 100 has been trained by the methods described above, for example, classifier 100 can be utilized to classify and categorize a newly presented data object. In addition to the training methods described above, several other classifier training techniques known in the art may also be utilized to train classifier 100. Such training techniques known in the art include Trenkle's ad hoc rank analysis, Spearman's rank correlation coefficient, centroid analysis, vector dot product, Euclidean distance, and a support vector machine.

Figure 8A:
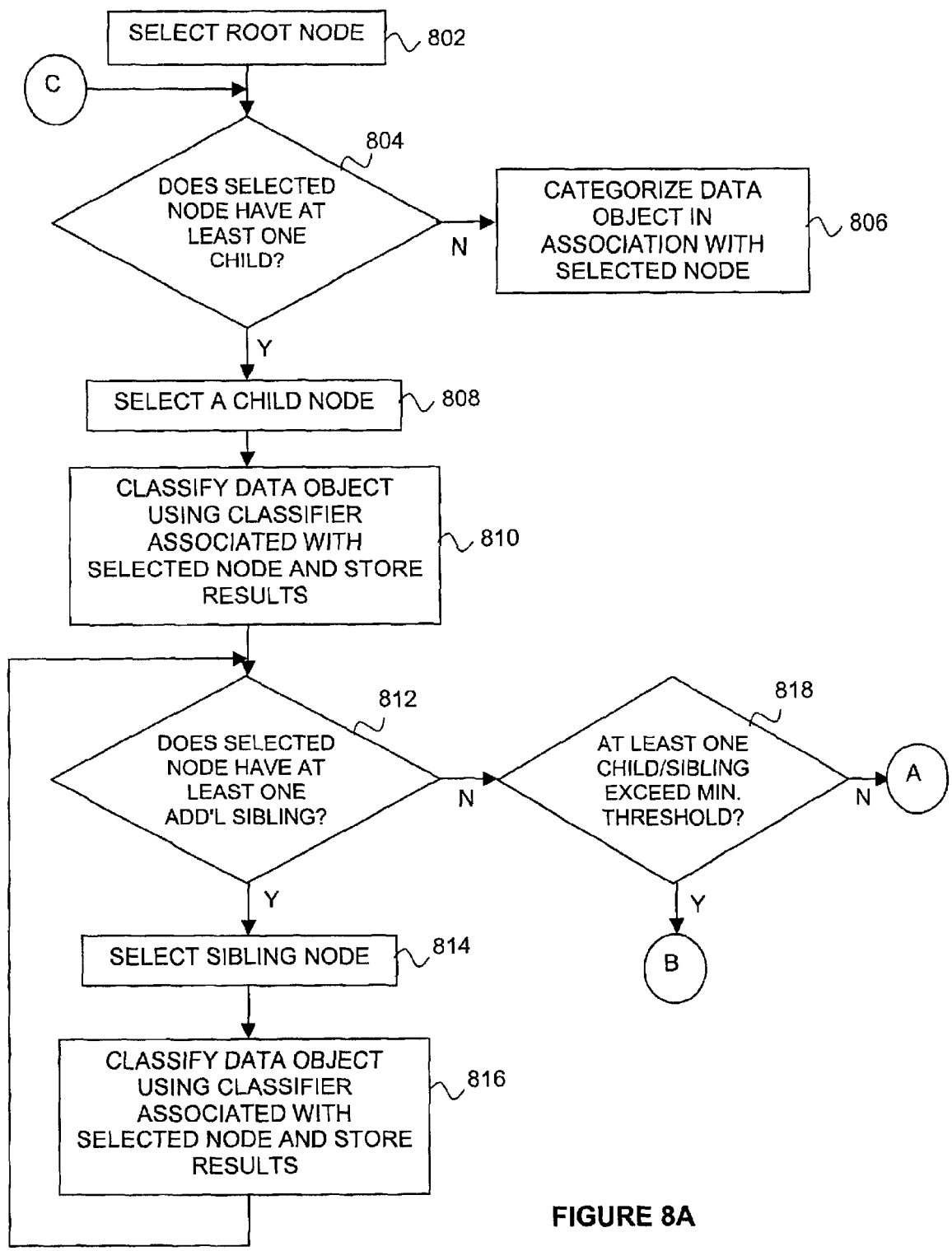
FIGS. 8A and 8B together illustrate an operational flow of certain aspects of the classifier categorization services of FIG. 1, in accordance with one embodiment of the invention.
Figure 8B:
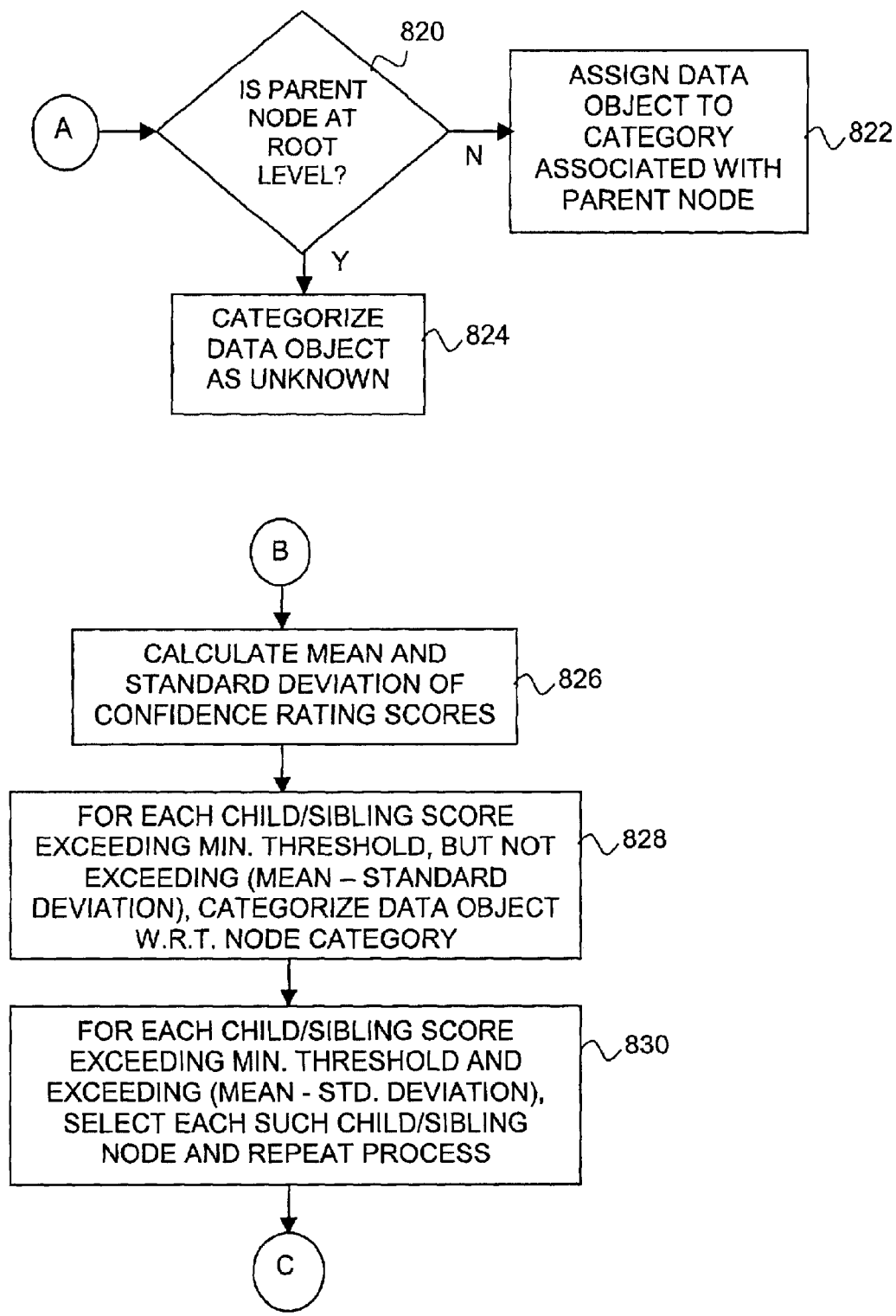

FIGS. 8a and 8b together illustrate an operational flow of relevant aspects of classifier categorization services 115 including node selection function 116, classification function 117, and discrimination function 118 of FIG. 1, in accordance with one embodiment of the invention. Each data object to be categorized is examined by each of the classifiers (i.e. stored characterizations) for the child nodes at given level and depending upon the outcome, is either categorized as belonging to the subject associated with the selected node or is further examined at the next level of the hierarchy.

The categorization process begins by selecting the root node of the hierarchy to be the starting point, block 802. In other embodiments, nodes other than the root node may be identified as the starting point. Once the starting point is selected, a determination is made as to whether the selected node is the parent of at least one child node, block 804. If it is determined that the selected node is not the parent of at least one child node, the data object is categorized in association with the subject matter of the selected node, block 806. If, however, it is determined that the selected root node is the parent of at least one child node, a first of the child nodes is then selected, block 808. The data object is then classified using the classifier associated with the selected node, block 810.

A determination is then made as to whether the selected node has at least one sibling node, block 812. As mentioned earlier, a first node is considered to be a sibling of a second node if the first and second nodes share a common parent node. If it is determined that the selected node has at least one sibling node, one of such sibling nodes is then selected and the data object is classified using the classifier associated with the newly selected sibling node, blocks 814 and 816 respectively. Each classification performed in an attempt to categorize the data object results in the generation of a confidence rating which is stored in association with each respective node, in a data store such as data store 110 for example. Once the data object is classified by a first (and possibly only) sibling node, a determination is again made as to whether any additional sibling nodes remain, block 812. Each additional sibling node is selected, for classifying the data object resulting in a confidence rating for each sibling node. This process continues until no further sibling nodes exist, block 812.

Once it is determined that no further sibling nodes exist, a determination is then made as to whether the confidence rating of at least one of the classified child/sibling nodes exceeds a minimum threshold, block 818. The minimum threshold may be set so as to depend upon various aspects of the categorization hierarchy. For example, if the categorization hierarchy contains many categorization levels, the minimum threshold may be set relatively high so as to encourage a more precise categorization, whereas if the categorization hierarchy contains relatively few categorization levels, the minimum threshold may be set relatively low so as to encourage any categorization.

If it is determined that no child or sibling node exceeds the minimum threshold, a further determination is made as to whether the parent node of the selected child/sibling node is a root node, block 820. If the parent node of the selected child/sibling node is a root node and the child/sibling node exceeds the established minimum threshold, the data object is unable to be categorized and is assigned to a default "unknown" category, block 824. If, however, no child/sibling node exceeds the established minimum threshold and the parent node of the selected child/sibling node is not a root node, the data object is assigned to the subject category associated with the parent node, block 822.

If at block 818 it is determined that the confidence rating of at least one child/sibling node exceeds the established minimum threshold, then a secondary metric is calculated and applied to the child/sibling node(s) exceeding the minimum threshold. In the illustrated embodiment, the mean and standard deviation of the previously stored confidence ratings are calculated, block 826.

Next, comparisons between each of the previously obtained confidence ratings and the calculated mean and standard deviation are made. For each child/sibling confidence rating that exceeds the established minimum threshold, but does not exceed the value represented by mean minus the standard deviation, then the data object is categorized with respect to the selected node category, block 828. On the other hand, for each child/sibling confidence rating that exceeds both the established minimum threshold and the value represented by the mean minus the standard deviation, then the process described above is repeated, block 830. That is, each child/sibling node meeting the criteria established in block 830, is selected in parallel and a further determination is made as to whether that child/sibling node is a parent of at least one child node itself, block 804. This process is repeated in parallel for each node meeting the established criteria until a leaf node is reached or the data object is able to be categorized, whichever comes first.

Example Computer System

Figure 9:
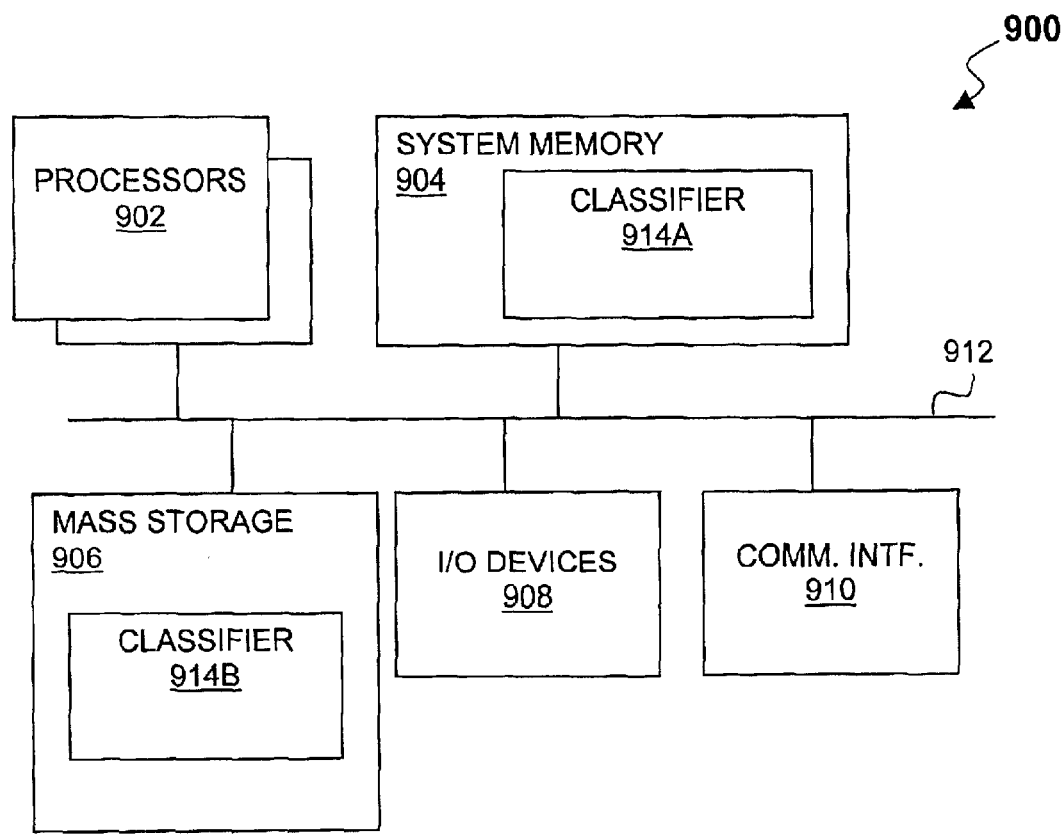
FIG. 9 illustrates an example computer system suitable for use to practice the present invention, in accordance with one embodiment.
Figure 10:
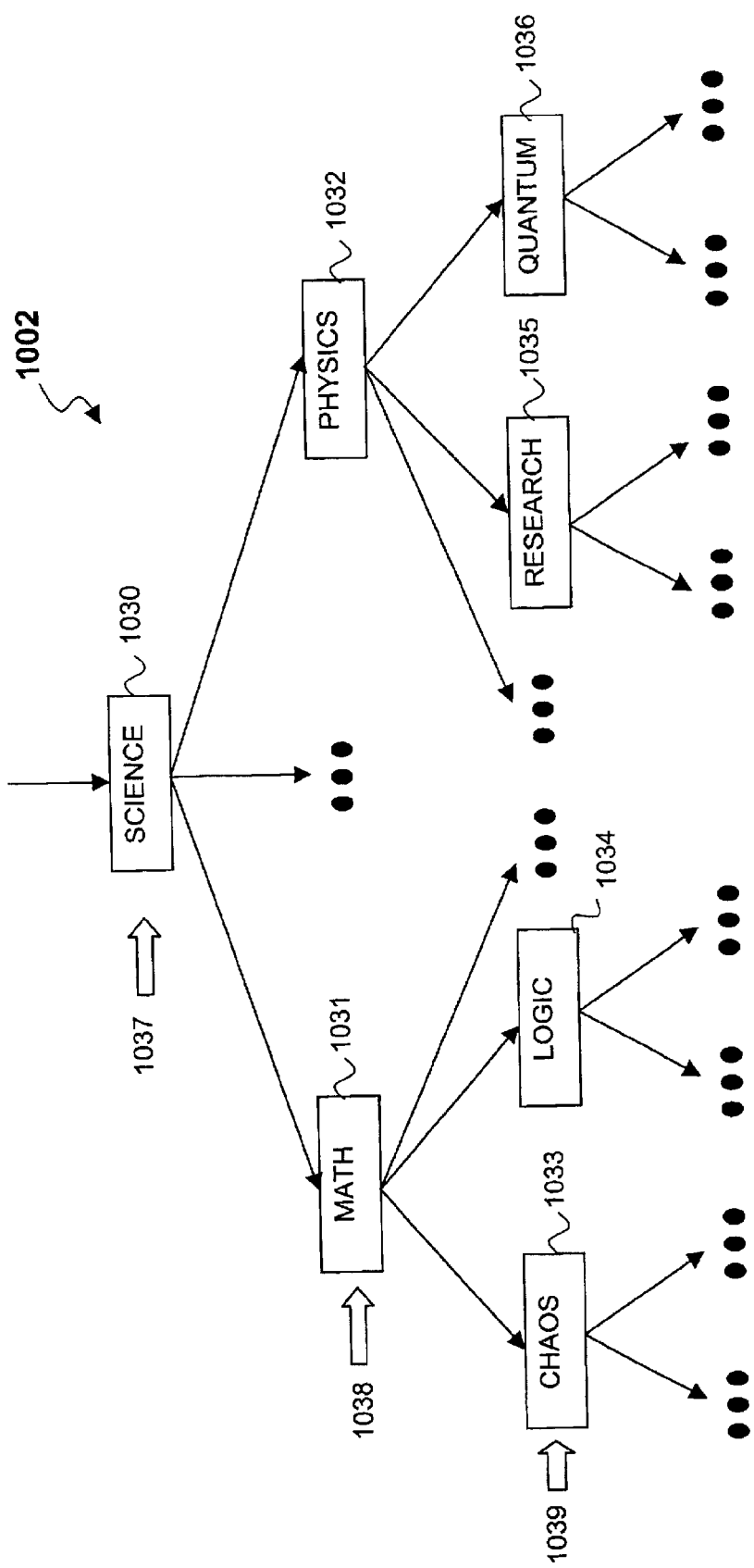
FIG. 10 illustrates an exemplary prior art subject hierarchy including multiple decision nodes.

FIG. 9 illustrates an example computer system suitable for use in association with the categorization system of the present invention, in accordance with one embodiment. As shown, computer system 900 includes one or more processors 902 and system memory 904. Additionally, computer system 900 includes mass storage devices 906 (such as diskette, hard drive, CDROM and so forth), input/output devices 908 (such as keyboard, cursor control and so forth) and communication interfaces 910 (such as network interface cards, modems and so forth). The elements are coupled to each other via a system bus 912, which represents one or more buses. In the case where system bus 912 represents multiple buses, they are bridged by one or more bus bridges (not shown).

Each of these elements performs its conventional functions known in the art. In particular, system memory 904 and mass storage 906 are employed to store a working copy and a permanent copy of the programming instructions implementing the categorization system of the present invention. The permanent copy of the programming instructions may be loaded into mass storage 906 in the factory or in the field, as described earlier, through a distribution medium (not shown), or through communication interface 910 from a distribution server (not shown). The constitution of these elements 902–12 are known, and accordingly will not be further described.

Conclusion and Epilogue

Thus, it can be seen from the above descriptions, a novel method and apparatus for very-large-scale automatic categorization of web content has been described. The novel method/apparatus is advantageously scalable to support an ever-increasing amount of data objects requiring categorization.

While the present invention has been described in terms of the above-illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method of training a classifier system by utilizing previously classified data objects comprising one or more electronic documents including at least one of a text document, an image file, an audio sequence, a video sequence, and a hybrid document including a combination of text and images, said previously classified data objects being organized into a subject hierarchy of a plurality of nodes, the method comprising:

selecting one node of the plurality of nodes;

aggregating those of the previously classified data objects corresponding to the selected node and any associated sub-nodes of the selected node, to form a content class of data objects, said content class of data objects comprising a content class of the one or more electronic documents;

aggregating those of the previously classified data objects corresponding to any associated sibling nodes of the selected node and any associated sub-nodes of the sibling nodes to form an anti-content class of data objects, said anti-content class of data objects comprising an anti-content class of the one or more electronic documents; and extracting features from at least one of the content class of data objects and the anti-content class of data objects to facilitate characterization of said previously classified data objects.

2. The method of claim 1, wherein said node is a root node.

3. The method of claim 1, wherein said aggregating those of the previously classified data objects corresponding to the selected node and any associated sub-nodes comprises aggregating those of the previously classified data objects corresponding to the selected node and all of said associated sub-nodes.

4. The method of claim 1, wherein said aggregating those of the previously classified data objects corresponding to any associated sibling nodes comprises aggregating those of the previously classified data objects corresponding to all of said associated sibling nodes.

5. The method of claim 1, wherein said aggregating those of the previously classified data objects corresponding to any associated sibling nodes of the selected node and any associated sub-nodes of the sibling nodes comprises aggregating those of the previously classified data objects corresponding to all of said associated sibling nodes of the selected node and all of said associated sub-nodes.

6. The method of claim 1, wherein said extracting features further comprises determining which of said extracted features are salient features and creating said content and anti-content class of data objects based upon said salient features.

7. The method of claim 6, wherein said determining which extracted features are salient further comprises:
   ranking said extracted features based upon a frequency of occurrence for each extracted feature;
   identifying a corner feature of said extracted features such that the frequency of occurrence of said corner feature is equal to or immediately greater than its corresponding rank, and wherein said corner feature defines a first group of features having respective frequencies of occurrence greater than the corner feature, and a second group of features having respective frequencies of occurrence less than the corner feature; and
   accepting a first set of features from said first group of features and a second set of features from said second group of features, wherein the cumulative frequencies of occurrence of said first set of features is a fractional percentage of the cumulative frequencies of occurrence of said second set of features.

8. The method of claim 7, wherein the cumulative frequencies of occurrence of said first set of features is approximately 20 percent of the cumulative frequencies of occurrence of said second set of features, and the cumulative frequencies of occurrence of said second set of features is approximately 80 percent of the cumulative frequencies of occurrence of said first set of features.

9. The method of claim 6, wherein said salient features are n-gram salient features.

10. The method of claim 6, wherein said extracted features are determined to be salient based upon mutual information techniques.

11. An apparatus comprising:
    a storage medium having stored therein a plurality of programming instructions designed to implement a plurality of functions of a category name service for providing a category name to a data object, including first one or more functions to
       select a first node of a hierarchically organized classifier having a plurality of nodes and one or more previously classified data objects associated with each of said plurality of nodes,
       aggregate those of the previously classified data objects corresponding to the selected node and any associated sub-nodes of the selected node to form a content class of data objects,
       aggregate those of the previously classified data objects corresponding to any associated sibling nodes of the selected node and any associated sub-nodes of the sibling nodes to form an anti-content class of data objects,
       extract features from at least one of the content class of data objects and the anti-content class of data objects to facilitate characterization of said previously classified data objects; and
    a processor coupled to the storage medium to execute the programming instructions.

12. The apparatus of claim 11, wherein said first node is a root node.

13. The apparatus of claim 11, wherein said plurality of instructions to aggregate those of the previously classified data objects corresponding to the selected node and any associated sub-nodes further comprise instructions to aggregate those of the previously classified data objects corresponding to the selected node and all of said associated sub-nodes.

14. The apparatus of claim 11, wherein said plurality of instructions to aggregate those of the previously classified data objects corresponding to any associated sibling nodes further comprise instructions to aggregate those of the previously classified data objects corresponding to all of said associated sibling nodes.

15. The apparatus of claim 11, wherein said plurality of instructions to aggregate those of the previously classified data objects corresponding to any associated sibling nodes of the selected node and any associated sub-nodes of the sibling nodes further comprise instructions to aggregate those of the previously classified data objects corresponding to all of said associated sibling nodes of the selected node and all of said associated sub-nodes.

16. The apparatus of claim 11, wherein said plurality of instructions to extract features further comprise instructions to determine which of said extracted features are salient features and creating said content and anti-content class of data objects based upon said salient features.

17. The apparatus of claim 16, wherein said plurality of instructions to determine which extracted features are salient further comprise instructions to
    rank said extracted features based upon a frequency of occurrence for each extracted feature;
    identify a corner feature of said extracted features such that the frequency of occurrence of said corner feature is equal to or immediately greater than its corresponding rank, and wherein said corner feature defines a first group of features having respective frequencies of occurrence greater than the corner feature, and a second group of features having respective frequencies of occurrence less than the corner feature; and
    accept a first set of features from said first group of features and a second set of features from said second group of features, wherein the cumulative frequencies of occurrence of said first set of features is a fractional percentage of the cumulative frequencies of occurrence of said second set of features.

18. The apparatus of claim 17, wherein the cumulative frequencies of occurrence of said first set of features is approximately 20 percent of the cumulative frequencies of occurrence of said second set of features, and the cumulative frequencies of occurrence of said second set of features is approximately 80 percent of the cumulative frequencies of occurrence of said first set of features.

19. The apparatus of claim 16, wherein said salient features are n-gram salient features.

20. The method of claim 16, wherein said salient features are determined based upon mutual information techniques.

21. The apparatus of claim 11, wherein said data object comprises an electronic document.

22. The apparatus of claim 21, wherein said electronic document comprises at least one of a text document, an image file, an audio sequence, a video sequence, and a hybrid document including a combination of text and images.

* * * * *